(12) United States Patent
Mahmoudkhani et al.

(10) Patent No.: US 10,077,392 B2
(45) Date of Patent: *Sep. 18, 2018

(54) DEFOAMING COMPOSITIONS

(71) Applicant: Kemira Oyj, Helsinki (FI)

(72) Inventors: Amir H. Mahmoudkhani, Atlanta, GA (US); Bava Luciana, Dunwoody, GA (US); Robert E. Wilson, Marietta, GA (US)

(73) Assignee: Kemira Oyj, Helsinki (FI)

( * ) Notice: Subject to any disclaimer, the term of this patent is extended or adjusted under 35 U.S.C. 154(b) by 319 days.

This patent is subject to a terminal disclaimer.

(21) Appl. No.: 13/630,261

(22) Filed: Sep. 28, 2012

(65) Prior Publication Data
US 2014/0090845 A1 Apr. 3, 2014

(51) Int. Cl.
| | |
|---|---|
| C09K 8/48 | (2006.01) |
| C09K 8/42 | (2006.01) |
| E21B 33/13 | (2006.01) |
| C04B 24/04 | (2006.01) |
| C04B 28/02 | (2006.01) |
| C09K 8/467 | (2006.01) |
| C04B 24/32 | (2006.01) |
| C04B 103/50 | (2006.01) |

(52) U.S. Cl.
CPC .............. C09K 8/42 (2013.01); C04B 24/045 (2013.01); C04B 24/32 (2013.01); C04B 28/02 (2013.01); C09K 8/467 (2013.01); E21B 33/13 (2013.01); C04B 2103/50 (2013.01)

(58) Field of Classification Search
CPC .. C09K 2208/28; C09K 2208/32; C09K 8/03; C09K 8/28; C09K 8/54; C09K 8/588; C09K 8/524; C09K 11/7773; C09K 2208/24; C09K 3/00; C09K 3/16; C09K 8/467; C09K 8/48; C09K 8/584; C09K 8/68; E21B 31/113; E21B 33/00; E21B 33/035; E21B 33/04; E21B 33/0422; E21B 33/064; E21B 33/08; E21B 33/10; E21B 33/1204; E21B 33/1212; E21B 33/124; E21B 33/1246; E21B 33/127; E21B 33/13; E21B 43/168; E21B 43/2405; E21B 43/255; E21B 43/29; E21B 43/34; E21B 43/36; E21B 43/38; E21B 47/0001; E21B 47/0007; E21B 47/011; E21B 47/02216; E21B 47/024; E21B 47/091; E21B 47/124
See application file for complete search history.

(56) References Cited

U.S. PATENT DOCUMENTS

| | | | |
|---|---|---|---|
| 3,697,438 A * | 10/1972 | Liberman | B01D 19/0404 162/72 |
| 5,460,698 A | 10/1995 | Nguyen | |
| 5,446,289 A | 11/1995 | Yonezawa Toshio | |
| 5,661,206 A | 8/1997 | Tanaka | |
| 6,063,183 A | 5/2000 | Goisis | |
| 6,919,388 B2 | 7/2005 | Nishikawa et al. | |
| 9,475,975 B2 * | 10/2016 | Mahmoudkhani | C04B 24/32 |
| 2003/0187101 A1 | 10/2003 | Shendy et al. | |
| 2007/0012222 A1 | 1/2007 | Szymanski et al. | |
| 2008/0220994 A1 | 9/2008 | Chatterji | |
| 2010/0292380 A1 * | 11/2010 | Martin | B01D 19/0404 524/314 |
| 2011/0226164 A1 * | 9/2011 | Andrioletti | C04B 24/08 106/810 |
| 2012/0220692 A1 * | 8/2012 | Mahmoudkhani | C04B 24/32 523/130 |

FOREIGN PATENT DOCUMENTS

| | | |
|---|---|---|
| EP | 2072559 | 6/2009 |
| WO | WO 94/20680 | * 9/1994 |
| WO | WO94/20680 | * 9/1994 |
| WO | WO 2008/117372 | 10/2008 |
| WO | WO 2009036128 A1 | 3/2009 |

OTHER PUBLICATIONS

Technical Bulletin BASF.*
Search Report for United Kingdom Patent Application No. 1715722. 3, dated Nov. 10, 2017.

* cited by examiner

Primary Examiner — Kumar R Bhushan
(74) Attorney, Agent, or Firm — King & Spalding

(57) ABSTRACT

Cement compositions and processes for reducing air entrainment in a cement composition generally include mixing a hydraulic cement with a defoamer compositions including one or more organic acid ester polymers selected from an organic acid ester of polyethylene oxide polymer, an organic acid ester of polypropylene oxide polymer, and a mixture thereof. The compositions may further comprise an organic acid ester of an ethylene oxide-propylene oxide block copolymer.

13 Claims, 4 Drawing Sheets

DEFOAMING COMPOSITIONS

CROSS-REFERENCE TO RELATED APPLICATION

This application claims priority to U.S. Provisional Application 61/541,790, filed Sep. 30, 2011, which is incorporated herein by reference in its entirety.

FIELD OF THE ART

The present disclosure generally relates to defoaming compositions and methods for reducing air entrainment in fluids.

BACKGROUND

Worldwide, it is estimated that 1.8 billion tonnes of Portland cement are produced annually making it one of the most widely used manmade products on earth. Concrete and other cement-based materials define a major component of the materials used in civil engineering applications such as buildings, bridges, roads and other transportation infrastructures, as well as underground constructions such as cementing a well bore.

Primary cementing is the process of placing cement in the annulus between the casing and the formations exposed to the wellbore. Since its inception in 1903, the major objective of primary cementing has always been to provide zonal isolation in the oil, gas and water wells. To achieve this objective, a hydraulic seal must be created between the casing and cement and between the cement and the formations, while at the same time preventing fluid channels in the cement sheath. Oil and gas cementing service companies have introduced various chemical additives in order to achieve and improve desired properties of cement slurries. Many of such cement additives can cause the slurry to foam during mixing. Excessive slurry foaming can have several undesirable consequences. Slurry gelation can result, and loss of hydraulic pressure during pumping can occur owing to cavitation on the mixing system. In addition, air entrainment may cause undesired slurry densities to be pumped down hole as measured density at surface will be different than actual downhole density increasing the risk of formation damage.

During slurry mixing, a densitometer or mass flow meter is used to help field operators proportion the solid and liquid ingredients. If air is present in the slurry at the surface, the density of the system "cement+water+air" is measured by the densitometer. Since the air becomes compressed downhole, the true downhole slurry density becomes higher than the measured surface density which can damage the formation. Antifoaming or defoaming agents are usually added to the mix water or dry-blended with the cement to prevent such problems. They may also be used for breaking foamed fluids. In such applications, defoamer may be utilized to break the excess foamed fluid returned to surface after well treatment and thus facilitate disposal process. In general, desirable antifoaming or defoaming agents, have the following characteristics to be effective: a) insoluble in the foaming system, and b) lower surface tension than the foaming system. The antifoaming agent functions largely by spreading on the surface of the foam or entering the foam lamella. Because the film formed by the spread of antifoam on the surface of a foaming liquid does not support foam, the foam situation is alleviated.

BRIEF SUMMARY

Disclosed herein are defoaming compositions comprising one or more organic acid ester polymers selected from an organic acid ester of polyethylene oxide polymer, an organic acid ester of polypropylene oxide polymer, and a mixture thereof. In certain embodiments, the compositions may further comprise an organic acid ester of an ethylene oxide-propylene oxide block copolymer. Cement compositions including the defoaming composition, methods for reducing air entrainment in cement compositions, and methods for cementing a subterranean formation are also disclosed herein.

The disclosure may be understood more readily by reference to the following detailed description of the various features of the disclosure and the examples included therein.

BRIEF DESCRIPTIONS OF THE DRAWINGS

FIG. 1 is a graph of the defoaming effect of various dioleate esters of polyoxyethylene (EO) polymers on cement slurry density. Average molecular weight of EO DO −1, EO DO −2 and EO DO −3 esters are, 828, 928 and 1128 Daltons, respectively. Dosages are given as BWOC.

FIG. 2 is a graph of the defoaming effect of various dioleate esters of polyoxypropylene (PO) polymers on cement slurry density. Average molecular weight of PO DO −1, PO DO −2 and PO DO −3 esters are, 1528, 2528 and 4528 Daltons, respectively. Dosages are given as BWOC.

DETAILED DESCRIPTION

Figure 1:
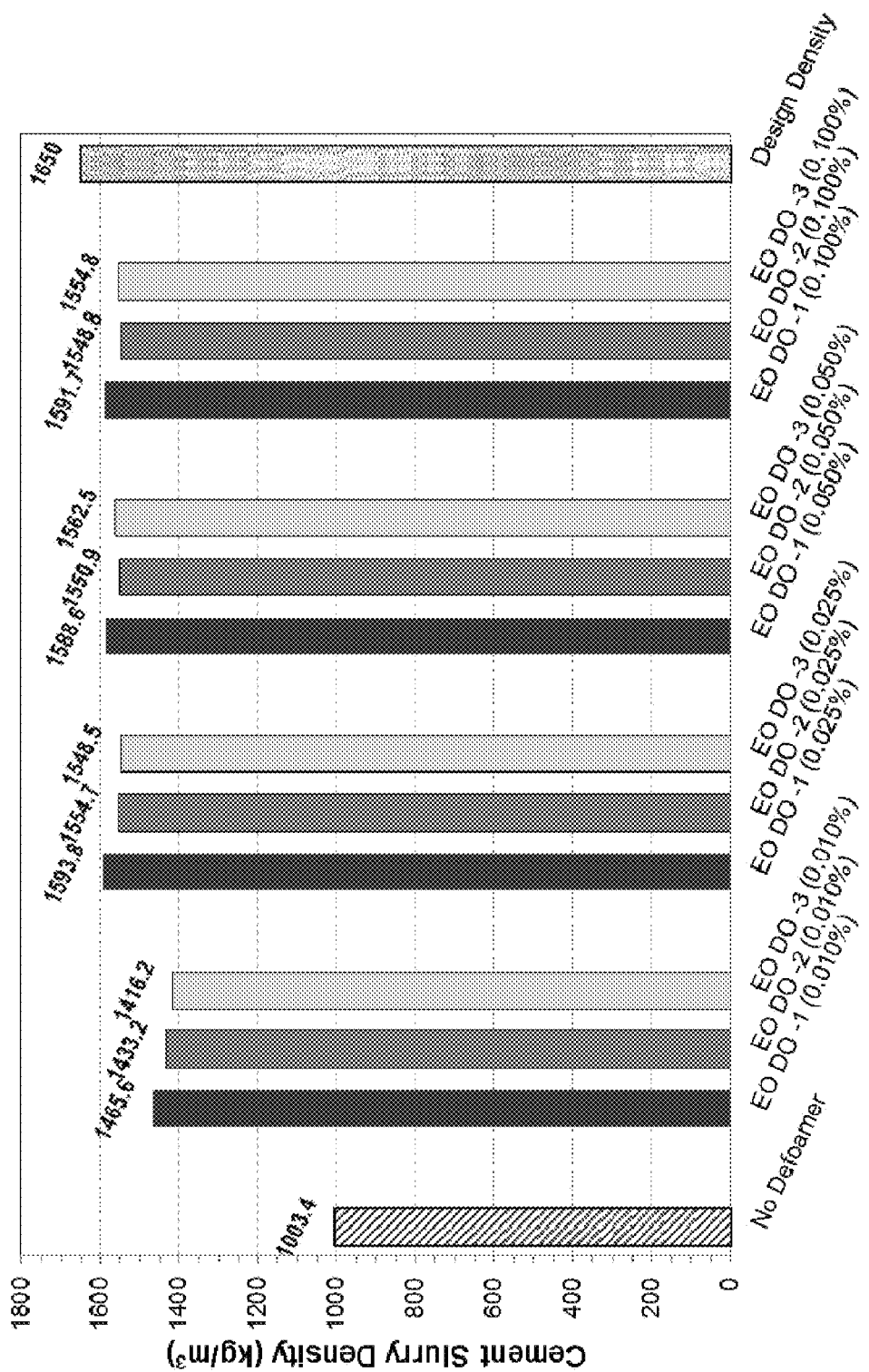

Defoaming compositions and methods for reducing the air entrainment in a fluid such as a cement composition are provided. The defoaming compositions generally comprise one or more organic acid ester polymers selected from an organic acid ester of polyethylene oxide polymer, an organic acid ester of polypropylene oxide polymer, and a mixture thereof. In certain embodiments, the compositions may further comprise an organic acid ester of an ethylene oxide-propylene oxide block copolymer.

In other embodiments, one or more organic acid ester polymers selected from (a) an organic acid ester of polyethylene oxide polymer, (b) an organic acid ester of polypropylene oxide polymer, and (c) an organic acid ester of an ethylene oxide-propylene oxide block copolymer.

In certain embodiments, the defoaming compositions comprise two or more organic acid ester polymers selected from (a) an organic acid ester of polyethylene oxide polymer, (b) an organic acid ester of polypropylene oxide polymer, and (c) an organic acid ester of an ethylene oxide-propylene oxide block copolymer.

In any of the foregoing embodiments, the organic acid ester compounds have a low acid number, for example less than 15.

These defoaming compositions provide effective foam control by reducing air entrainment relative to other conventional defoamers, are relatively biodegradable, and are less toxic.

In one embodiment, the composition comprises an organic acid ester of polyethylene oxide polymer. In another embodiment, the composition comprises an organic acid ester of polypropylene oxide polymer. In certain embodiments, the composition comprises an organic acid ester of an ethylene oxide-propylene oxide block copolymer. In another embodiment, the composition comprises an organic acid ester of an ethylene oxide-propylene oxide block copolymer and an organic acid ester of polyethylene oxide polymer or an organic acid ester of polypropylene oxide polymer.

In one embodiment, the composition comprises an organic acid ester of polyethylene oxide polymer and an organic acid ester of polypropylene oxide polymer. In one embodiment, the composition comprises an organic acid ester of polyethylene oxide polymer and an organic acid ester of an ethylene oxide-propylene oxide block copolymer. In another embodiment, the composition comprises an organic acid ester of polypropylene oxide polymer, and an organic acid ester of an ethylene oxide-propylene oxide block copolymer.

In one embodiment, the composition comprises an organic acid ester of polyethylene oxide polymer of the formula:

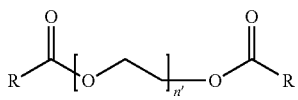

wherein R is a linear or branched, saturated or unsaturated, alkyl or alkyl carboxylate group having from 3 to 40 carbon atoms; and n' is 4 to 23.

In one embodiment, the composition comprises an organic acid ester of polypropylene oxide polymer of the formula:

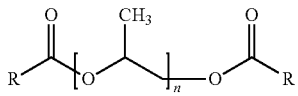

wherein R is a linear or branched, saturated or unsaturated, alkyl or alkyl carboxylate group having from 3 to 40 carbon atoms; and n is 16 to 68.

In one embodiment, the composition comprises an organic acid ester of an ethylene oxide-propylene oxide block copolymer of the formula:

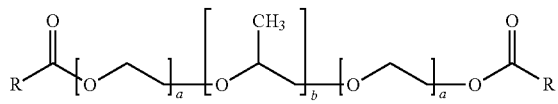

wherein R is a linear or branched, saturated or unsaturated, alkyl or alkyl carboxylate group having from 3 to 40 carbon atoms, a is 2 to 8 and b is 16 to 68.

In one embodiment, the defoaming composition comprises an organic acid ester of polyethylene oxide polymer and an organic acid ester of polypropylene oxide polymer. In certain embodiments, the organic acid ester moieties of the organic acid ester of polyethylene oxide polymer and the organic acid ester of polypropylene oxide polymer are the same. In certain embodiments, the organic acid ester moieties of the organic acid ester of polyethylene oxide polymer and the organic acid ester of polypropylene oxide polymer are the different.

In one embodiment, the defoaming composition comprises an organic acid ester of polyethylene oxide polymer and an organic acid ester of an ethylene oxide-propylene oxide block copolymer. In certain embodiments, the organic acid ester moieties of the organic acid ester of polyethylene oxide polymer and the organic acid ester of an ethylene oxide-propylene oxide block copolymer are the same. In certain embodiments, the organic acid ester moieties of the organic acid ester of polyethylene oxide polymer and the organic acid ester of an ethylene oxide-propylene oxide block copolymer are the different.

In one embodiment, the defoaming composition comprises an organic acid ester of polypropylene oxide polymer and an organic acid ester of an ethylene oxide-propylene oxide block copolymer. In certain embodiments, the organic acid ester moieties of the organic acid ester of polypropylene oxide polymer and the organic acid ester of an ethylene oxide-propylene oxide block copolymer are the same. In certain embodiments, the organic acid ester moieties of the organic acid ester of polypropylene oxide polymer and the organic acid ester of an ethylene oxide-propylene oxide block copolymer are the different.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units form by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer.

Polyoxyethylene, also known as polyethylene glycol (PEG), has low toxicity and is used in variety of products. Suitable polyoxyethylene polymers for use in the present invention are terminated with hydroxyl groups and have a molecular weight from about 200 to about 1000 Daltons. In certain embodiments, the average molecular weight of the polymer is about 200 to about 600 Daltons. In other embodiments, the average molecular weight of the polymer is about 300 to about 400 Daltons.

Polyoxypropylene, also known as polypropylene glycol (PPG), is less toxic than PEG. Suitable polyoxypropylene polymers are terminated with hydroxyl group, having a molecular weight from 1000 to 4000 Daltons.

Organic acid esters of polyoxyethylene or polyoxypropylene are suitable for use in the defoaming compositions described herein. The organic acid ester of either the polyoxyethylene polymer or the polyoxypropylene polymer is the reaction product of the polymer and an organic acid that has at least one carboxylic acid group, including mono-, di- or multi-carboxylic acid functionalities. Suitable organic acids include, without limitation, oleic acid, stearic acid, suberic acid, azelaic acid, sebacic acid, phthalic acid, isophthalic acid, terephthalic acid, and mixtures thereof. The organic acid ester of the polyoxypropylene polymer or the polyoxyethylene polymer are of the formulas shown below:

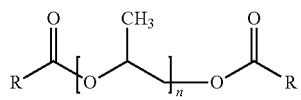

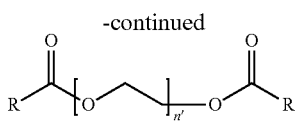

wherein R is a linear or branched, saturated or unsaturated, alkyl or alkyl carboxylate group having from 3 to 40 carbon atoms, n is 16 to 68 and n' is 4 to 23. Many PEG and PPG diesters are commercially available.

The block copolymer of ethylene oxide and propylene oxide is not intended to be limited to any particular structure and is commercially available in several types. Suitable polyoxyethylene-polyoxypropylene copolymers are terminated with hydroxyl groups and generally have an average molecular weight of 1000 to 5000 Daltons, and in other embodiments, an average molecular weight of 2000 to 4000 Daltons, and in still other embodiments, an average molecular weight of 2000 to 2750 Daltons and preferably possess a melting point below 20° C. For example, Poloxamers are nonionic triblock copolymers composed of a central hydrophobic chain of polypropylene oxide flanked by two hydrophilic chains of polyethylene oxide. A schematic representation of a Poloxamer copolymer is shown here:

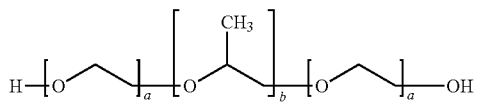

The ethylene oxide and propylene oxide block copolymers are also known by trade names Pluronic® from BASF and Mulsifan from Zschimmer & Schwarz GmbH & Co. Because the lengths of the polymer blocks can be customized, many different EO/PO block copolymers exist having slightly different properties.

The organic acid ester of the ethylene oxide-propylene oxide block copolymer is the reaction product of the block copolymer and an organic acid that has at least one carboxylic acid group, including mono-, di- or multi-carboxylic acid functionalities. Suitable organic acids include, without limitation, oleic acid, stearic acid, suberic acid, azelaic acid, sebacic acid, phthalic acid, isophthalic acid, terephthalic acid, and mixtures thereof.

The organic acid ester of the ethylene oxide-propylene oxide is of the general structure:

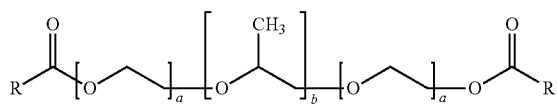

wherein R is a linear or branched, saturated or unsaturated, alkyl or alkyl carboxylate group or aryl or aryl carboxylate group having from 3 to 40 carbon atoms, a is 2 to 8 and b is 16 to 68. As noted above, the composition has a low acid value. In one embodiment, the acid value is less than 15, and in other embodiments, the acid value is less than 5. As used herein, the term acid value generally refers to the number of milligrams of potassium hydroxide needed to neutralize the carboxylic acid groups in one gram of polymer. Thus, in the case of di- and multi-carboxylic acid esters, the free carboxylic acid groups, if present, may be further esterified to prevent adverse effects on other fluid properties. The particular block structure is not intended to be limited and may have an ordered (EO-PO-EO or PO-EO-PO) or random arrangements. For example, in some embodiments, the polyoxyethylene-polyoxypropylene portion has a polyoxypropylene backbone with polyoxyethylene end cap whereas in other embodiments, the polyoxyethylene-polyoxypropylene fatty acid esters have a polyoxyethylene backbone with polyoxypropylene end caps. Still further, in some embodiments, the backbone alkyl group R may further include hydroxyl containing substituents such as may occur using castor oil derivatives as the di- or multicarboxylic acid.

The polyoxyethylene-polyoxypropylene organic acid esters can be prepared by conventional means such as by a condensation reaction of the desired alcohol (e.g., polyethylene glycol-polypropylene glycol (EO/PO) block polymer) with a mono-, di- or multi-carboxylic acid in the presence of a suitable catalyst at an elevated temperature. Alternatively, the polyoxyethylene-polyoxypropylene organic acid esters can be prepared by transesterification of the EO/PO block copolymer with a triglyceride of the desired mono-, di-, or multi-carboxylic acid and a base such a potassium hydroxide or other suitable alkalis as the catalyst.

In any of the foregoing embodiments, the organic acid ester may be an oleic acid ester.

In a particular embodiment, the compositions may further comprise hydrophobic solids. The optional hydrophobic solids such as silicon dioxide (silica) may be used to enhance the performance of the esters defoaming ability. The hydrophobic silica may fumed, precipitated, or a mixture thereof. Other suitable hydrophobic solids include talc, clays, aluminosilcates, mica, alumina and such.

The defoaming compositions may also be diluted in a diluent system, for example an organic diluent or mixture of diluents. Such diluents include but are not limited to mineral oil, vegetable oil, alpha olefins, glycols, alcohols, kerosene and mixtures thereof. The defoaming compositions may also comprise water. In particular embodiments, the defoaming composition comprises vegetable oil.

In one embodiment, the defoaming composition comprises one or more organic acid ester polymers selected from (a) an organic acid ester of polyethylene oxide polymer, (b) an organic acid ester of polypropylene oxide polymer, and (c) an organic acid ester of an ethylene oxide-propylene oxide block copolymer; and each component may comprise from about 0 to about 100% by weight of the organic acid ester polymers in the composition. In certain embodiments, two or more types of organic acid esters polymers are included in the composition and each polymer may comprises from about 1% to about 99%, about 2% to about 98%, about 5% to about 95%, about 10% to about 90%, about 15% to about 85%, about 20% to about 80%, about 25% to about 75%, about 30% to about 70%, about 35% to about 65%, about 40% to about 60%, about 45% to about 55%, or about 50% each, by weight of the organic acid ester polymers in the composition.

The defoaming composition including the organic acid esters of the polyoxyethylene, polyoxypropylene and/or ethylene oxide-propylene oxide block copolymer as described herein can be added to cement compositions at 0.01 to 1% by weight of the cement (BWOC).

The defoaming compositions can be added to the cement composition before, during, or after blending of the various components of the cement composition. The defoaming compositions can be added as a liquid or as an emulsion or as dry products as may be desired for the intended application. In one exemplary embodiment, the defoaming composition can be combined with a cementitious material and a fluid such as water to form the cement composition before or during the blending of those components. This blending can occur at the pumphead, which displaces the cement composition down through the annulus of a wellbore (i.e., the area between a pipe in the wellbore and the wall of the wellbore) wherein it is allowed to set into a hard material, for example cement. The defoaming compositions serve to prevent or reduce the formation of foam during the preparation or pumping of the cement composition or to break the foam from a well treatment fluid returned to the surface. In another embodiment, the defoaming composition can be added to an already prepared cement composition before pumping the composition into a subterranean formation where it is allowed to set into a hard cement. In this case, the defoaming composition can serve to prevent or reduce the formation of foam in the cement composition as it is being pumped. In each of these embodiments, the ability of the defoaming composition to reduce the level of gas entrained in the cement composition can result in the formation of relatively stronger cement that can properly support the piping in the wellbore. The defoaming composition can also be incorporated in the cement composition to help control the density of the ensuing hardened cement. In yet another embodiment, the defoaming compositions can be combined with a previously foamed wellbore treatment fluid such as a foamed cement or foamed drilling mud to break or reduce the foam therein. Due to the removal of the foam, the wellbore treatment fluid can be readily disposed of after its use.

In one embodiment, a method for reducing air entrainment in a cement composition is provided, the method comprising: adding a defoaming composition to a cement composition wherein the defoaming composition comprises one or more organic acid ester polymers selected from an organic acid ester of polyethylene oxide polymer, an organic acid ester of polypropylene oxide polymer, and mixtures thereof; wherein the air entrainment in the cement composition is reduced relative to a cement composition without the defoaming composition. In certain embodiments, the composition may further comprise an organic acid ester of an ethylene oxide-propylene oxide block copolymer. In certain embodiments, the defoaming composition is added to the cement composition at 0.01 to 1% by weight of the cement.

In one embodiment, a method for reducing air entrainment in a cement composition is provided, the method comprising: adding a defoaming composition to a cement composition wherein the defoaming composition comprises one or more organic acid ester polymers selected from (a) an organic acid ester of polyethylene oxide polymer, (b) an organic acid ester of polypropylene oxide polymer, and (c) an organic acid ester of an ethylene oxide-propylene oxide block copolymer; wherein the air entrainment in the cement composition is reduced relative to a cement composition without the defoaming composition. In certain embodiments, the defoaming composition is added to the cement composition at 0.01 to 1% by weight of the cement.

In one embodiment, a method for reducing air entrainment in a cement composition is provided, the method comprising: adding a defoaming composition to a cement composition wherein the defoaming composition comprises two or more organic acid ester polymers selected from (a) an organic acid ester of polyethylene oxide polymer, (b) an organic acid ester of polypropylene oxide polymer, and (c) an organic acid ester of an ethylene oxide-propylene oxide block copolymer; wherein the air entrainment in the cement composition is reduced relative to a cement composition without the defoaming composition. In certain embodiments, the defoaming composition is added to the cement composition at 0.01 to 1% by weight of the cement.

In one embodiment, a cement composition comprising: hydraulic cement; water; and a defoaming composition comprises one or more organic acid ester polymers selected from an organic acid ester of polyethylene oxide polymer, an organic acid ester of polypropylene oxide polymer, and mixtures thereof, is provided. In certain embodiments, the composition may further comprise an organic acid ester of an ethylene oxide-propylene oxide block copolymer.

In one embodiment, a cement composition comprising: hydraulic cement; water; and a defoaming composition comprises one or more organic acid ester polymers selected from (a) an organic acid ester of polyethylene oxide polymer, (b) an organic acid ester of polypropylene oxide polymer, and (c) an organic acid ester of an ethylene oxide-propylene oxide block copolymer; is provided.

In one embodiment, a cement composition comprising: hydraulic cement; water; and a defoaming composition comprises two or more organic acid ester polymers selected from (a) an organic acid ester of polyethylene oxide polymer, (b) an organic acid ester of polypropylene oxide polymer, and (c) an organic acid ester of an ethylene oxide-propylene oxide block copolymer; is provided.

In a particular embodiment, the hydraulic cement comprises hydraulic cements comprising calcium, aluminum, silicon, oxygen and/or sulfur; Portland cements such as class A, B, C, G, and H cements according to American Petroleum Institute (API) specification for materials and testing for well cements; pozzolana cements; gypsum cements; phosphate cements; high alumina content cements; slag cements; cement kiln dust; silica cements; high alkalinity cements; and combinations comprising at least one of the foregoing cements.

In another embodiment, a method of cementing a subterranean formation is provided, the method comprising: displacing a cement composition into the subterranean formation, the cement composition comprising hydraulic cement, water, and a defoaming composition comprises one or more organic acid ester polymers selected from an organic acid ester of polyethylene oxide polymer, an organic acid ester of polypropylene oxide polymer, and mixtures thereof; and allowing the cement to set. In certain embodiments, the composition may further comprise an organic acid ester of an ethylene oxide-propylene oxide block copolymer.

In another embodiment, a method of cementing a subterranean formation is provided, the method comprising: displacing a cement composition into the subterranean formation, the cement composition comprising hydraulic cement, water, and a defoaming composition comprises one or more organic acid ester polymers selected from (a) an organic acid ester of polyethylene oxide polymer, (b) an organic acid ester of polypropylene oxide polymer, and (c) an organic acid ester of an ethylene oxide-propylene oxide block copolymer; and allowing the cement to set.

In another embodiment, a method of cementing a subterranean formation is provided, the method comprising: displacing a cement composition into the subterranean formation, the cement composition comprising hydraulic cement, water, and a defoaming composition comprises two or more organic acid ester polymers selected from (a) an organic acid ester of polyethylene oxide polymer, (b) an organic acid ester of polypropylene oxide polymer, and (c) an organic acid ester of an ethylene oxide-propylene oxide block copolymer; and allowing the cement to set.

In certain embodiments, the cement composition comprises pumping the cement composition into an annular space between the walls of a well bore and casing during a primary of a remedial cementing operation. In one embodiment, the hydraulic cement is foamed and the defoaming composition is added to the hydraulic cement in an amount effective to break the foam, thereby reducing gas entrainment in the hydraulic cement. In one embodiment, the defoaming composition is at 0.01 to 1% weight of the hydraulic cement.

The cement compositions can include the defoaming compositions described herein, a cementitious material, and a sufficient amount of fluid to render the cement compositions pumpable. Any of a variety of cements suitable for use in subterranean cementing operations may be used. The cementitious material can include, for example, hydraulic cements which set and harden by reaction with water. Examples of suitable hydraulic cements include but are not limited to hydraulic cements comprising calcium, aluminum, silicon, oxygen and/or sulfur; Portland cements such as class A, B, C, G, and H cements according to American Petroleum Institute (API) specification for materials and testing for well cements; pozzolana cements; gypsum cements; phosphate cements; high alumina content cements; slag cements; cement kiln dust; silica cements; high alkalinity cements; and combinations comprising at least one of the foregoing cements. Examples of suitable fluids for use in the cement compositions include, but are not limited to, fresh water, produced water, seawater, brine solutions, and combinations comprising at least one of the foregoing.

As deemed appropriate by one skilled in the art, additional additives can be added to the cement composition for improving or changing the properties of the cement. Examples of such additives include but are not limited to set retarders, fluid loss control additives, dispersing agents, set accelerators, and formation conditioning agents. Other additives such as bentonite and silica fume can be introduced to the cement composition to prevent cement particles from settling to the bottom of the fluid. Further, a salt such as sodium chloride or potassium chloride can be added to the cement composition.

The defoaming compositions described herein can be included in various flowable end use materials to reduce the amount of entrained gas present in such materials. In addition to cement compositions, other examples of such end use materials include but are not limited to various water-based wellbore treatment fluids such as drilling muds, stimulation fluids, waste treatment compositions, water treatment compositions, leaching compositions (e.g. for mining), concrete and constructions materials applications, and oil and/or gas separation compositions. The various components of such compositions would be apparent to persons of ordinary skill in the art.

The following examples are presented for illustrative purposes only, and are not intended to be limiting.

EXAMPLES

For the following examples, the polymers are labeled as listed below.

| Label | Polymer type; average molecular weight in parentheses |
|---|---|
| EO/PO DO | an oleic acid ester of a polyoxyethylene-polyoxypropylene block copolymer (2528 Daltons) |
| EO DO[1] | an oleic acid ester of polyoxyethylene polymer (828 Daltons) |
| EO DO[2] | an oleic acid ester of polyoxyethylene polymer (928 Daltons) |
| EO DO[3] | an oleic acid ester of polyoxyethylene polymer (1128 Daltons) |
| PO DO[1] | a dioleic ester of polyoxypropylene polymer (1528 Daltons.) |
| PO DO[2] | a dioleic ester of polyoxypropylene polymer (2528 Daltons.) |
| PO DO[3] | a dioleic ester of polyoxypropylene polymer (4528 Daltons.) |

Example 1

In this example the compressive strength was measured for cement compositions with a defoaming agent. Tributylphosphate is a common cement defoamer and used as a reference to compare the performance of defoaming compositions. The defoaming agents are described in Table 1. Compressive strength data up to 48 hours for API class A cement with a density of 1800 kg/m$^3$ are shown given in Table 2. Compressive strength testing was carried out on CTE Model 2000-5 Ultrasonic Cement Analyzer according to API RP 10B-2 (Recommended Practice for Testing Well Cements) operating at 4000 psi pressure and temperature of 50° C. The results show that defoamer containing cements meet the necessary requirements for compressive strength and that the defoamer compositions can be used to create viable and useful cement blends. Minimum requirement in well cementing is a compressive strength of 3.5 MPa after 48 hours.

TABLE 1

Defoaming compositions used in compressive strength development study

| Label | Defoaming Components |
|---|---|
| Defoamer A | Tributylphosphate (100%) |
| Defoamer B | EO DO$^2$ (30%) in Vegetable Oil |
| Defoamer C | EO/PO DO (30%) in Vegetable Oil |
| Defoamer D | EO/PO DO (10%) + EO DO$^2$ (20%) in Vegetable Oil |

TABLE 2

Compressive strength development of API Class A Cement slurries with 0.2% BWOC* defoamer

| Cement Sample | Compressive Strength (MPa) | | | | | |
|---|---|---|---|---|---|---|
| | 6 hrs | 12 hrs | 18 hrs | 24 hrs | 36 hrs | 48 hrs |
| With Defoamer A | 5.46 | 8.59 | 10.51 | 11.84 | 13.24 | 14.12 |
| With Defoamer B | 5.98 | 9.19 | 11.11 | 12.58 | 14.45 | 15.23 |
| With Defoamer C | 6.10 | 9.37 | 11.25 | 12.71 | 14.46 | 15.57 |
| With Defoamer D | 5.29 | 8.48 | 10.26 | 11.63 | 13.16 | 14.01 |

*BWOC = By Weight Of Cement

Example 2

In this example, the effect of defoamer composition on the rheology of API class A cement blends with density of 1800 kg/m$^3$ was studied using a Fann 35A viscometer at 25 and 50° C. The slurry was prepared by mixing dry cement and tap water on a Waring blender according to API RP 10B-2 and allowed to condition for 20 minutes using a Chandler Engineering model 1200 Atmospheric Consistometer at the given temperature. The rheology data is given in Table 3. It has been found that the defoamer composition had minimal or no effect on the rheological behavior of cement slurries.

TABLE 3

Rheological behavior of API Class A cement blend with density of 1800 kg/m³.

| Defoamer 0.2 wt % BWOC | Temperature ° C. | Shear Rate (rpm) | | | | | |
|---|---|---|---|---|---|---|---|
| | | 600 | 300 | 200 | 100 | 6 | 3 |
| | | | | Dial Reading | | | |
| None | 25 | 56.0 | 41.0 | 34.5 | 26.0 | 13.0 | 8.5 |
| PO DO³ | 25 | 57.0 | 42.5 | 36.0 | 27.5 | 13.5 | 9.5 |
| PO DO² | 25 | 53.0 | 39.5 | 33.0 | 26.0 | 12.5 | 9.0 |
| PO DO¹ | 25 | 57.0 | 40.0 | 33.5 | 25.5 | 13.0 | 9.0 |
| None | 50 | 109.0 | 85.5 | 76.5 | 65.5 | 22.0 | 14.0 |
| EO DO² | 50 | 84.0 | 70.5 | 66.0 | 55.0 | 17.5 | 10.5 |
| PO DO³ | 50 | 126.0 | 114.0 | 94.5 | 79.5 | 21.5 | 14.5 |
| EO/PO DO | 50 | 106.0 | 83.0 | 71.0 | 61.0 | 22.0 | 14.0 |
| EO/PO DO (10%) + EO DO² (20%) in Veg. Oil | 50 | 113.0 | 86.5 | 73.0 | 59.5 | 21.0 | 14.0 |

Example 3

In this example, defoaming characteristics of various diesters of polyoxyethylene (EO) compositions on API class cement A slurries with design density of 1650 kg/m³ containing 1% by weight of cement (BWOC) of sodium lignosulfonate and 20% by weight of water sodium chloride were examined. The diesters were formed using oleic acid (designated using DO). Lignosulfonates are commonly used in formulating cement slurries as cement dispersing agents. Densities were measured immediately after the slurry was prepared (based on API RP 10B-2 procedure) using a graduated cylinder and weight of the slurry. Data are graphically represented in FIG. 1. All defoaming compositions tested were found to be effective on reducing air entrainment when added at 0.01% to 0.10% BWOC.

Example 4

Figure 2:
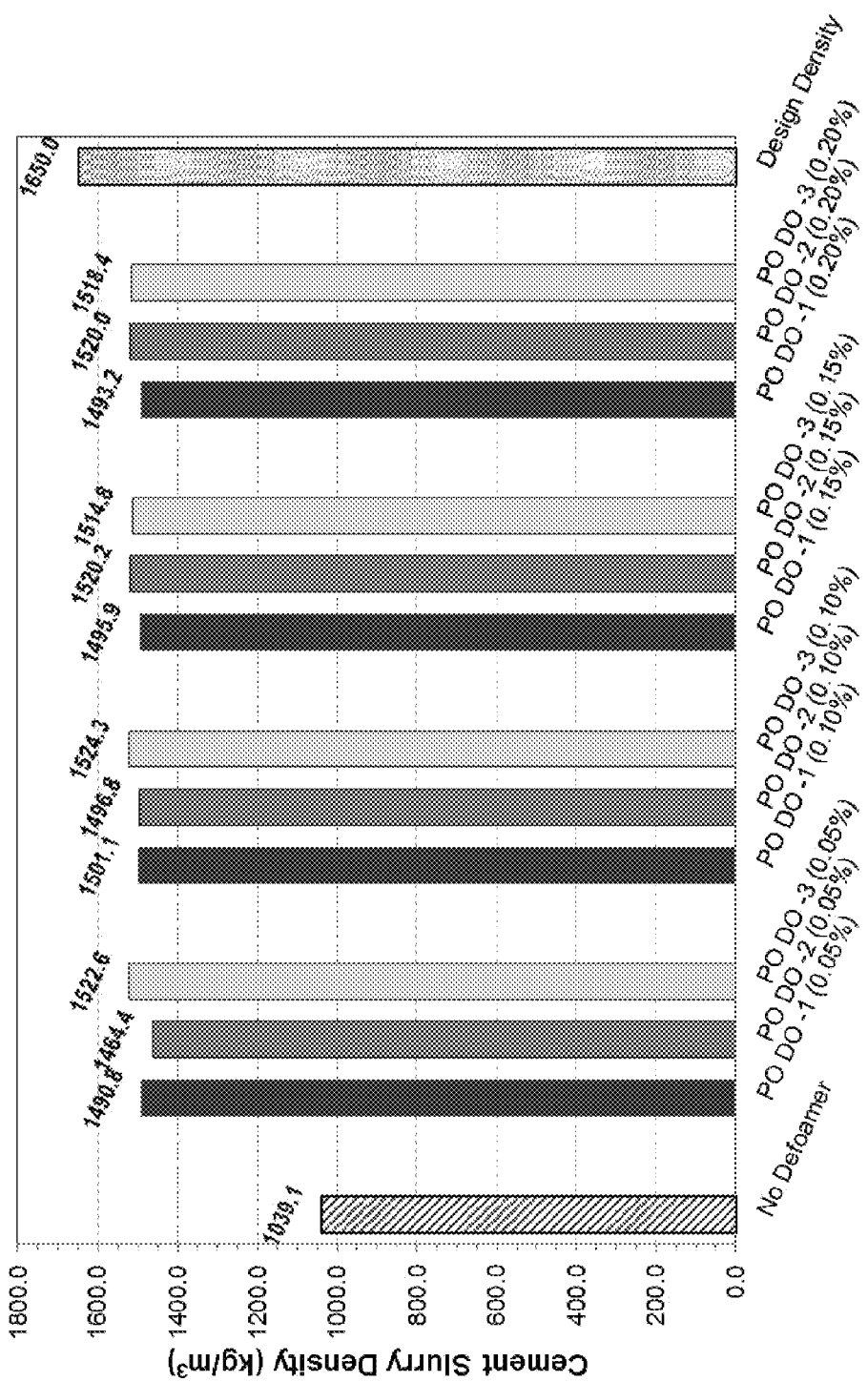

In this example, defoaming characteristics of various diesters of polyoxypropylene (PO) compositions on API class cement A slurries with design density of 1650 kg/m³ containing 1% BWOC of sodium lignosulfonate and 20% by weight of water sodium chloride were examined. The diesters were formed using oleic acid. Lignosulfonates are commonly used in formulating cement slurries and is generally known as cement dispersing agents. Densities were measured immediately after the slurry was prepared (based on API RP 10B-2 procedure) using a graduated cylinder and weight of the slurry. Data are graphically represented in FIG. 2. All defoaming compositions tested were found to be effective on reducing air entrainment when added at 0.05% to 0.20% BWOC.

Example 5

Figure 3:
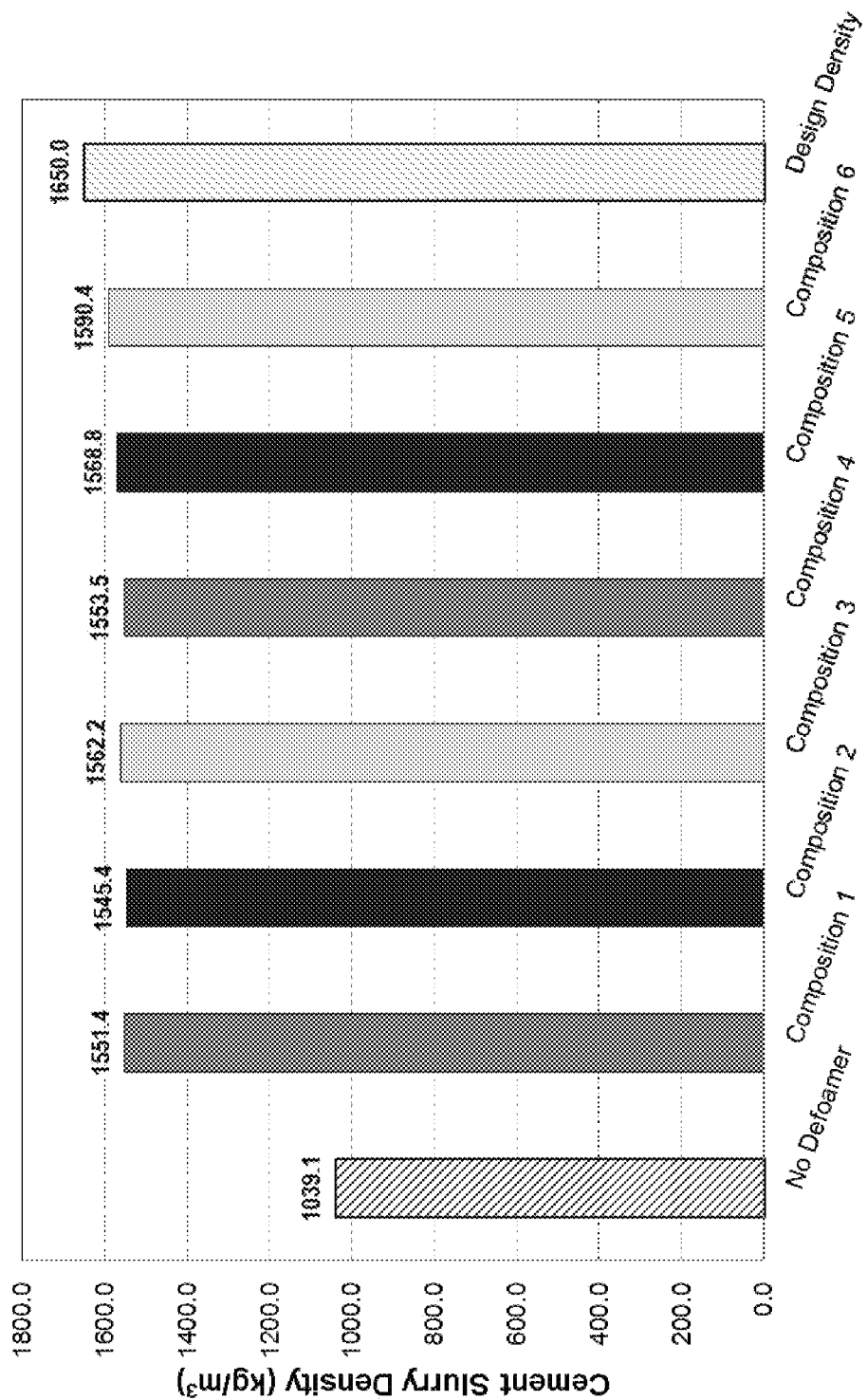
FIG. 3 is a graph of the defoaming effect of PO DO esters in combination with EO or EO/PO diesters. Defoaming compositions are described in Table 4.

Many cement additives can cause the slurry to foam during mixing including surface active agents such as dispersants. In this example, performance of various defoaming compositions were examined in a highly foaming system containing sodium lignosulfonate (1% BWOC), sodium chloride (20% by weight of water) and API class A cement with a designed density of 1650 kg/m³. Data are graphically represented in FIG. 3 and defoaming compositions are described in Table 4. As shown in FIG. 3, in the absence of defoamer, air entrainment causes the slurry density (1039 kg/m³) to be significantly lower than the designed density of 1650 kg/m³. In contrast, all defoamer compositions (added at 0.10% BWOC) were effective in antifoaming/defoaming in such a system.

TABLE 4

Description of defoaming compositions used in Example 5.

| Composition # | Defoaming Chemistry | Diluent |
|---|---|---|
| 1 | 10% EO/PO DO & 30% PO DO³ | Vegetable Oil |
| 2 | 20% EO/PO DO & 20% PO DO³ | Vegetable Oil |
| 3 | 30% EO/PO DO & 10% PO DO³ | Vegetable Oil |
| 4 | 10% EO DO² & 30% PO DO³ | Vegetable Oil |
| 5 | 20% EO DO² & 20% PO DO³ | Vegetable Oil |
| 6 | 30% EO DO² & 10% PO DO³ | Vegetable Oil |

Example 6

Figure 4:
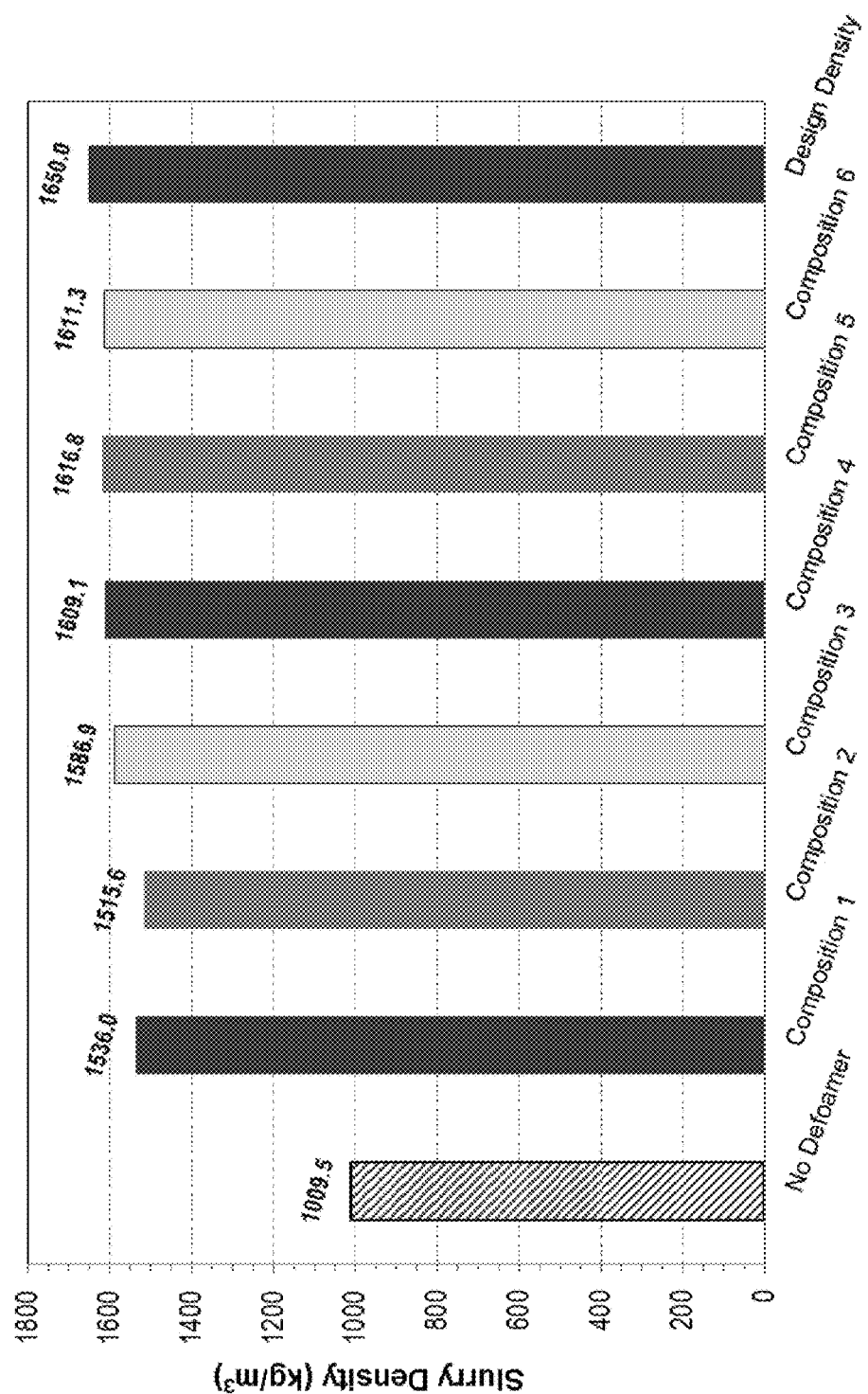
FIG. 4 is a graph of the defoaming effect of EO DO esters, EO/PO diesters, and various mixtures thereof. Defoaming compositions are described in Table 5.

In this example, the effect of the addition of 0.1% of defoaming composition by weight of cement (BWOC) on a cement composition containing 1% BWOC sodium lignosulfonate and 20% by weight of water sodium chloride was examined. Slurry density was measured immediately after mixing the dry cement with brine water and the dispersant. Data are graphically represented in FIG. 4 and defoaming compositions are described in Table 5. As shown in FIG. 4, formulations containing both diesters of EO polymers and diesters of EO/PO copolymers were found to be effective defoaming agents based on proximity of measured density and design density data.

TABLE 5

Description of defoaming compositions used in Example 6.

| Composition # | Defoaming Chemistry | Diluent |
|---|---|---|
| 1 | 20% EO/PO DO | Vegetable Oil |
| 2 | 20% EO DO² | Vegetable Oil |
| 3 | 20% EO/PO DO & 20% EO DO² | Vegetable Oil |
| 4 | 30% EO/PO DO & 10% EO DO² | Vegetable Oil |

TABLE 5-continued

Description of defoaming compositions used in Example 6.

| Composition # | Defoaming Chemistry | Diluent |
|---|---|---|
| 5 | 10% EO/PO DO & 20% EO DO² | Vegetable Oil |
| 6 | 20% EO/PO DO & 10% EO DO² | Vegetable Oil |

What is claimed is:

1. A defoaming composition comprising an organic acid ester of an ethylene oxide propylene oxide block copolymer of the formula:

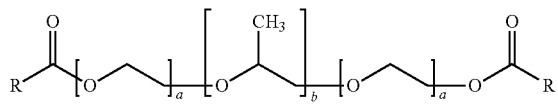

wherein R is a linear or branched, saturated or unsaturated, alkyl or alkyl carboxylate group having from 3 to 40 carbon atoms, a is 2 to 8 and b is 16 to 68;
and one or more organic acid ester polymers selected from an organic acid ester of polyethylene oxide polymer of the formula:

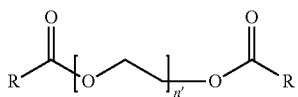

wherein R is a linear or branched, saturated or unsaturated, alkyl or alkyl carboxylate group having from 3 to 40 carbon atoms; and n' is 4 to 23;
an organic acid ester of polypropylene oxide polymer of the formula:

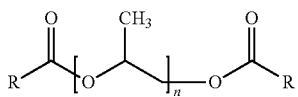

wherein R is a linear or branched, saturated or unsaturated, alkyl or alkyl carboxylate group having from 3 to 40 carbon atoms; and n is 16 to 68; and a mixture thereof;
wherein the composition comprises from about 10% to about 90% by weight of the organic acid ester of an ethylene oxide propylene oxide block copolymer; and
wherein the composition comprises a diluent system which consists essentially of an organic diluent or mixture of organic diluents.

2. The composition of claim 1, wherein the composition comprises an organic acid ester of polyethylene oxide polymer and an organic acid ester of polypropylene oxide polymer.

3. The composition of claim 1, wherein the one or more organic acid ester polymers composition comprises an organic acid ester of polyethylene oxide polymer and an organic acid ester of an ethylene oxide-propylene oxide block copolymer.

4. The composition of claim 1, wherein the composition comprises an organic acid ester of polypropylene oxide polymer, and an organic acid ester of an ethylene oxide-propylene oxide block copolymer.

5. The composition of claim 1, wherein the one or more organic acid ester polymers comprises an organic acid ester of polyethylene oxide polymer of the formula:

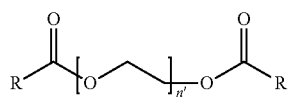

wherein R is a linear or branched, saturated or unsaturated, alkyl or alkyl carboxylate group having from 3 to 40 carbon atoms; and n' is 4 to 23.

6. The composition of claim 1, wherein the one or more organic acid ester polymers comprises an organic acid ester of polypropylene oxide polymer of the formula:

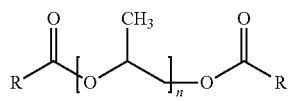

wherein R is a linear or branched, saturated or unsaturated, alkyl or alkyl carboxylate group having from 3 to 40 carbon atoms; and n is 16 to 68.

7. The composition of claim 1, wherein the organic acid ester of an ethylene oxide propylene oxide block copolymer is the reaction product of an ethylene oxide propylene oxide block copolymer and an organic acid having at least one carboxylic acid group.

8. The composition of claim 7, wherein the organic acid is oleic acid, stearic acid, suberic acid, azelaic acid, sebacic acid, phthalic acid, isophthalic acid, terephthalic acid, or a mixture thereof.

9. The composition of claim 1, further comprising a hydrophobic solid.

10. The composition of claim 1, wherein the organic diluent or mixture of organic diluents is selected from the group consisting of mineral oil, vegetable oil, alpha olefins, glycols, alcohols, kerosene and mixtures thereof.

11. The composition of claim 1, wherein the organic diluent or mixture of organic diluents comprises mineral oil or vegetable oil.

12. The composition of claim 1, wherein the diluent system consists of an organic diluent or mixture of organic diluents.

13. The composition of claim 1, wherein the defoaming composition consists of an organic acid ester of an ethylene oxide propylene oxide block copolymer and one or more organic acid ester polymers selected from an organic acid ester of polyethylene oxide polymer of the formula:

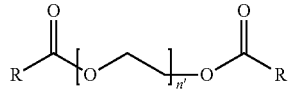

wherein R is a linear or branched, saturated or unsaturated, alkyl or alkyl carboxylate group having from 3 to 40 carbon atoms; and n' is 4 to 23;
an organic acid ester of polypropylene oxide polymer of the formula:

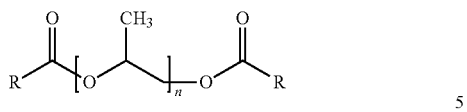

wherein R is a linear or branched, saturated or unsaturated, alkyl or alkyl carboxylate group having from 3 to 40 carbon atoms; and n is 16 to 68; and a mixture thereof;

and a diluent system which consists of an organic diluent or mixture of organic diluents;

wherein the composition comprises from about 10% to about 90% by weight of the organic acid ester of an ethylene oxide propylene oxide block copolymer.

* * * * *